Patented Oct. 18, 1927.

1,646,228

UNITED STATES PATENT OFFICE.

HARPER F. ZOLLER, OF DETROIT, MICHIGAN, ASSIGNOR TO ARCTIC DAIRY PRODUCTS COMPANY, OF DETROIT, MICHIGAN, A CORPORATION OF MICHIGAN.

FOOD COMPOUND AND PROCESS OF MAKING SAME.

No Drawing.   Application filed April 8, 1925. Serial No. 21,692.

The invention relates to synthetic food products having the physical character and the general dietetic character of evaporated milk and it has to do more particularly with that class of liquid food products which are marketed in a sterile condition in hermetically sealed containers.

The present application is in part a continuation of my application Serial No. 576,631, filed July 21, 1922.

One of the objects of the invention is to provide a food of the character mentioned which is at least equal to cow's milk in food value and is susceptible of being produced at lower cost than normal cow's milk similarly packed.

Another object of the invention is the provision of a synthetic food product which not only equals cow's milk in dietetic value but which surpasses normal cow's milk in its suitability for the diet of infants and also in its nutritive value in the diet of adults.

A further object of the invention is the production of a synthetic food product possessing the above noted properties and having the form of a sterile emulsion substantially free from curdling and lumping.

Still another object of the invention is the provision of a food product of the character in question having the physical characteristics of evaporated cow's milk, including the characteristic coloring effect of such an evaporated milk when added to coffee, tea, or the like, and also the flavor characteristic of the fatty solids of cow's milk.

The objects in view are attained by evaporative concentration of a liquid mixture preferably containing (a) solids of milk, not fat, (b) fat, either in the form of milk fat or vegetable fat or of a combination of milk fat and vegetable fat, (c) egg yolk, or, if preferred egg yolk fat, and (d), under some conditions, a suitable small amount of alkali phosphate.

I have preferred to keep the amounts of the various constituents of my improved product within percentage limits, by weight of finished product, as follows:

| | Per cent. |
|---|---|
| Milk solids not fat | 18–22 |
| Fatty material (not including egg yolk fat) | 0.30–9 |
| Egg yolk solids | 0.25–2 |

A composition which I have found very satisfactory contains approximately 18% milk solids not fat, 7.8% milk fat, and 1.0% egg yolk solids, making a total of 26.8% of total solids for the finished product.

In order that the practice of the invention may be quite clearly understood, I shall now describe in detail a method of procedure to produce the product in its preferred form. The apparatus necessary or desirable is such as is required in ordinary milk condensing plants in which the product is canned for the market. Assuming that the product is to have the composition last given above with total solids of 26.8%, the ingredients for a batch may suitably be as follows:

10,000 pounds skimmed milk, titrating 0.15% or less of lactic acid.

300 pounds milk fat.

45 pounds dry egg yolk, free from rancidity and putrefaction.

25 pounds di-sodium hydrogen phosphate (carrying twelve molecules of water of crystallization).

To combine these constituents, the milk is run into the forewarmers or hot wells, and the milk fat, in the form of cream, oil or sweet butter is mixed with this milk. Then the dry egg yolk is preferably mixed with some of the milk to form a thick batter-like mixture which also is added to the milk in the hot wells.

The sodium phosphate, dissolved in about two gallons of hot water is then added to the mixture and the latter is then heated to 165°–210° F. and preferably to 185°–200° F. for a period of several minutes and preferably for about twenty minutes. This heating can conveniently be accomplished by the introduction of live steam in the well-known manner. The liquid mixture is then drawn into the vacuum pan and evaporated at about 135°–140° F. to approximately the desired concentration of total solids, the concentration being preferably carried somewhat beyond the desired point. The mixture is then drawn from the vacuum pan into a standardization tank where the desired standard of concentration is effected. The mixture is then thoroughly emulsified by forcing it through a homogenizer or viscolizer under suitable pressures. The mixture is then immediately cooled to about 35° F. at which temperature it is held previous to canning and sterilizing. The canning is carried out in the manner usually employed in packing evaporated milk. That is to say, the product is placed in tin cans which are hermetically sealed and then heated at a temperature of 235°–250° F. for a length of time necessary to produce a sterile product. The canned product is then shaken in the usual manner.

As above indicated, so far as the broader aspects of my invention are concerned the fat content of the product may be either in the form of milk fat or vegetable fat, or a combination of the two. In order that the nature of the product and the process of making it may be clearly understood in the case of the use of vegetable fat the following example is given.

The constituents are provided in proportion as follows:

10,000 pounds skimmed milk, titrating 0.15% or less of lactic acid.

260 pounds refined cocoanut oil, titrating less than 0.05% free acid, calculated as oleic acid.

50 pounds dry egg yolk, (or 100 lbs. of natural moist egg yolk) free from rancidity and putrefaction.

5 pounds di-sodium hydrogen phosphate (carrying twelve molecules of water of crystallization).

To combine these constituents the cocoanut fat is placed in the hot well and heated to about 90° F. The egg yolk is then stirred into the melted oil until no lumps are visible. The moderate temperature of 90° F. is specified to avoid coagulation of the egg yolk at this stage. The temperature might be carried as high as 120° F. without causing such coagulation, but nothing is to be gained by the higher temperature and it is better to keep it below 100° F. Next, the skimmed milk is run into the oil and egg yolk mixture, meanwhile stirring. Then the sodium phosphate is dissolved in about two gallons of hot water and the solution added to the milk menstruum.

The liquid mixture is now heated with live steam to a temperature of 165°–210° F., and preferably within the range of 185°–200° F. This temperature should be maintained for several minutes and preferably for about twenty minutes, after which the mixture is drawn into the vacuum pan and evaporated at 130°–140° F. to a standard of 6% fat and 24% total solids. The evaporated product is now emulsified by running it through a homogenizer or viscolizer and subsequently cooled, as by passing over a brine cooler, to 35°–40° F. at which temperature it is held for canning and sterilization as above described.

If it is desired that the product contain both vegetable fat and milk fat, a portion of the 260 pounds of cocoanut oil in the last example can be replaced with the same amount of milk fat, the two fats being together introduced into the mix in the manner above described for the cocoanut oil.

The procedures which have been described in connection with the two examples given above can be varied in many cases. For example, the dry egg yolk can be put directly into the hot wells in the form of powder, where it becomes thoroughly mixed with the milk by the turbulent action of steam introduced directly into the milk for the purpose of heating it. It is even possible to add the dry egg yolk to the liquid in the standardization tank after the liquid has been drawn from the vacuum pan, but if this is done it is best to add the egg yolk in the form of a batter which has been heated to 165°–205° F. for about twenty minutes. The object of this heating is to give the egg yolk substantially the same heat treatment that it secures when added as above described in the hot wells.

This pre-heating in the hot wells before evaporation last referred to has the important effect of coagulating the proteins and other materials in the egg yolk. A second effect is the raising of the curdling temperature of the milk. The result of both of these effects is that the mixture takes the heat during sterilization without curdling and lumping. In addition, if the egg yolk were not coagulated before it enters the vacuum pan it would tend to stick to the coils of the vacuum pan and burn on.

With respect to the range of heat treatment in the hot wells above described, it is to be noted that heating to 185° F. or upward is desirable in the fresh milk season, i. e., when cows are on green feed. At other times heating to 165° F. may suffice.

As a further variation of the above procedures, frozen egg yolks may be used with equal satisfaction in lieu of the dried yolk, account being taken, of course, of the moisture in the frozen product when proportioning the constituents.

The use of the sodium phosphate, as above described, is determined by the character of the milk used and by the amount of egg yolk used, the purpose of the phosphate being to compensate for the relatively large amount of calcium salts present in the egg yolk, and to further condition the salts equilibrium of the mixture so that the product after evaporation will withstand sterilization conditions without curdling in the cans. The use of alkali phosphate permits the use of a larger amount of egg yolk without curdling occurring during sterilization. The character of the milk, in this connection, varies with the nature of the feed of the cows producing the milk. When the cows are on dry feed there is less need for the use of the phosphate than when they are on green pasture. Thus when the milk used is from cows on dry feed and the amount of egg yolk specified in the first example, namely 1.0% is used, I find that the use of little if any of the sodium phosphates is necessary. However, if much more than 1% of egg yolk is used, the use of the alkali phosphate will be found desirable even if the milk used is from cows on dry feed; and even where less than 1% of egg yolk solids is used, it will usually be found desirable to add alkali phosphate to the mix if the milk is from cows on green feed. Any of the alkali phosphates, e. g., potassium phosphate or ammonium phosphate can be used in lieu of sodium phosphate but I prefer the latter on account of its lower cost.

If a product with only a small amount of fat, other than that of the egg yolk, is desired, a sufficient amount in the form of milk fat may be secured by the use of commercial skim milk, the latter ordinarily containing more or less cream left by the separator. In such case the procedure is like that first described above except that the addition of the milk fat in the hot well is omitted.

My improved product is quite as palatable as the best evaporated milk, having a similar flavor, and it is well adapted not only for culinary uses but also, when water is added, as a beverage and, in its condensed form, as a substitute for cream in coffee, tea and the like, the color given to coffee and tea being that characteristic of cream and ordinary evaporated milk.

Furthermore the product has dietetic and nutritious values even superior to those of the best evaporated milk. The high food values of milk, even of skimmed milk, and of vegetable fats, are of course universally understood and extensively utilized. Eggs, also, are one of the basic foods and their food value is in a general way well appreciated, but the food values peculiar to egg yolk, as distinguished from the white of the egg, are not commonly understood. However, these food values of egg yolk have been well established by the work of scientific investigators. It is well established that egg yolk has a remarkably large vitamine content, vitamines A and B both being present in it. The fat content of egg yolk is as rich in vitamine A as is butter fat and codliver oil and it is rich also in vitamine B. Thus by the introduction of the fat of egg yolk into my improved synthetic milk, I entirely overcome the lack of vitamine content which would otherwise result from the use of a subnormal amount of butter fat. In addition egg yolk contains vitamine X, the reproductive vitamine.

But egg yolk, in addition to its high vitamine content, has a very remarkable content of organic iron. Indeed, the percentage of organic iron contained in egg yolk is greater than in any other known food material. The organic form of the iron is of vital importance because it is only in this form that it can be assimilated. Indeed, organic iron is believed to be an antecedent of hæmoglobin contained in the red cells of the blood. Cases of mal-nutrition which are characterized by a depletion of the hæmoglobin can only be cured by the administration of organic iron in food in which it is in an organic combination resembling the hæmoglobin iron complex. Thus it will be seen that the high organic iron content of egg yolk makes it an extremely valuable food.

Egg yolk, furthermore, has a high phosphorous content as compared with the albumin of the egg and as compared also with milk. The phosphorous content of milk is largely in the form of inorganic phosphates such as calcium and potassium salts, about 60% of the total being in this form. The remainder exists as the phospho-protein, casein. The phosphorous content of egg yolk is more than five times that of milk and about one-half of it is in the form of phospho-protein, ovavitellin, while about three-fourths of the remainder is in the form of phosphorized fats such as lecithin and phospholipines. It is believed that phosphorized fats are essential to infant growth and they are certainly important in the diet of the adult for waste repair. Ovavitellin phosphorous is equally as important in the dietary as casein phosphorous.

Finally, it is to be observed that the composite ash of egg yolk is acid forming, in this respect being similar to all meats, while the ash of milk is base forming. Thus the combination of egg yolk with milk gives a desirable balance in this respect.

Egg yolk possesses other valuable characteristics as a concentrated food but its chief characteristics already mentioned, sufficiently indicate the marked advantages following from the inclusion of egg yolk in a synthetic milk product of the character in question. Not only are all the known food values of whole cow's milk secured, including the vitamines, but also the product has in substantial measures additional food substances and characteristics which are essential to normal human metabolism of both infant and adult. Furthermore, the product has the homogeneous form of a permanent, smooth emulsion like evaporated milk and is characterized by very excellent keeping qualities. Also, when vegetable fat is used, the product can be produced at a cost materially less than the cost of evaporated whole milk.

Again, since the food values of butter fat can be secured at less cost by the use of egg yolk in lieu of butter fat, it follows that even when no vegetable fat is used my improved product can be produced with food values equal to those of evaporated whole milk at lower cost than can the evaporated whole milk. Furthermore, the organic iron content and the phosphorous of egg yolk give my improved product dietetic and nutritive values that cannot be duplicated by the use of normal or evaporated cow's milk.

While I have indicated, in connection with the preferred compositions and the preferred procedures, various modifications of both, it will be understood that I have not attempted to indicate all the variations which can be made without departing from the invention but that the scope of the invention is indicated by the following claims.

What I claim is:

1. A synthetic food product comprising a sterile emulsified liquid of cream-like consistency and containing the non-fatty solids of milk in substantially their normal proportions to each other, fatty material, and the solids of egg yolk.

2. A synthetic food product comprising a sterile emulsified liquid of cream-like consistency and containing the non-fatty solids of milk in substantially their normal proportions to each other, milk fat, and the solids of egg yolk.

3. A synthetic food product comprising a sterile emulsified liquid mixture containing, by weight, 18%–22% of the non-fatty solids of milk, 0.3%–9% of milk fat, and 0.25%–2% of egg yolk solids.

4. A synthetic food product comprising a sterile emulsified liquid mixture containing, by weight, 18%–20% of the non-fatty solids of milk, 5%–8% of milk fat, and 0.5%–1.5% of egg yolk solids.

5. A synthetic food product comprising a sterile emulsified liquid mixture of non-fatty milk solids, fatty material, egg yolk solids, and alkali phosphate.

6. The process of making a synthetic food product which comprises heating a liquid mixture containing the non-fatty solids of milk, fatty material, and egg yolk solids at a temperature of 165°–210° F. for several minutes, emulsifying the mixture, and thereafter subjecting the mixture to a sterilizing heat treatment in hermetically sealed containers.

7. The process of making a synthetic food product which comprises heating a liquid mixture containing the non-fatty solids of milk, fatty material, and egg yolk solids at a temperature of 185°–210° F. for several minutes, emulsifying the mixture and thereafter subjecting the mixture to a sterilizing heat treatment in hermetically sealed containers.

8. The process of making a synthetic food product which comprises heating a liquid mixture containing the non-fatty solids of milk, fatty material, and egg yolk solids at a temperature of 165°–210° F. for several minutes, heating the mixture to remove a part of its moisture by evaporation, emulsifying the mixture, and thereafter subjecting the mixture to a sterilizing heat treatment in hermetically sealed containers.

9. The process of making a synthetic food product which comprises heating a liquid mixture containing the non-fatty solids of milk, fatty material, and egg yolk solids at a temperature of 185°–210° F. for several minutes, heating the mixture to remove a part of its moisture by evaporation, emulsifying the mixture, and thereafter subjecting the mixture to a sterilizing heat treatment in hermetically sealed containers.

10. The process of making a synthetic food product which comprises heating a liquid mixture containing the non-fatty solids of milk, fatty material, egg yolk solids, and alkali phosphate at a temperature of 185°–210° F., for several minutes, emulsifying the mixture, and thereafter subjecting the mixture to a sterilizing heat treatment in hermetically sealed containers.

In testimony whereof, I hereunto affix my signature.

HARPER F. ZOLLER.